United States Patent [19]

Stevens

[11] 3,846,558

[45] Nov. 5, 1974

[54] METHOD FOR CONVERTING ANIMAL WASTE PRODUCTS INTO A FOOD SUPPLEMENT

[75] Inventor: Roger H. Stevens, New York, N.Y.

[73] Assignee: International Farm Systems, Inc., New York, N.Y.

[22] Filed: Dec. 22, 1970

[21] Appl. No.: 100,587

Related U.S. Application Data

[63] Continuation-in-part of Ser. No. 829,194, Nov. 24, 1969, Pat. No. 3,633,547.

[52] U.S. Cl............... 426/2, 426/56, 426/59, 195/142
[51] Int. Cl............................................ A23k 1/00
[58] Field of Search......... 99/9, 2 R; 195/82; 210/2, 210/11, 12, 15, 18; 426/2, 56, 59

[56] References Cited
UNITED STATES PATENTS

| 2,528,403 | 10/1950 | West | 210/11 |
|---|---|---|---|
| 3,375,116 | 3/1968 | Anthony | 426/2 |
| 3,503,751 | 3/1970 | Durham | 426/2 |
| 3,546,812 | 12/1970 | Kobayashi et al. | 210/11 |
| 3,580,840 | 5/1971 | Unidil | 195/115 |

FOREIGN PATENTS OR APPLICATIONS

| 558,668 | 6/1958 | Canada | 99/9 |
|---|---|---|---|
| 802,487 | 10/1958 | Great Britain | 195/82 |

OTHER PUBLICATIONS

Jukes, "Yeast as Cattle Fodder", American Brewer, June, 1941, pp. 40–43.

Primary Examiner—Raymond N. Jones

[57] ABSTRACT

An animal feeding process wherein animal waste products are collected and fed to a storage vat and combined with a small quantity of a yeast culture and the combination of these products are aerated and agitated. The yeast culture in the presence of oxygen consumes the nutrients in the waste products and converts the waste products into a high protein animal feed supplement. This yeast product is then removed and added to the animal's feed i.e., ground corn, bean meal and the like.

16 Claims, 1 Drawing Figure

PATENTED NOV 5 1974
3,846,558
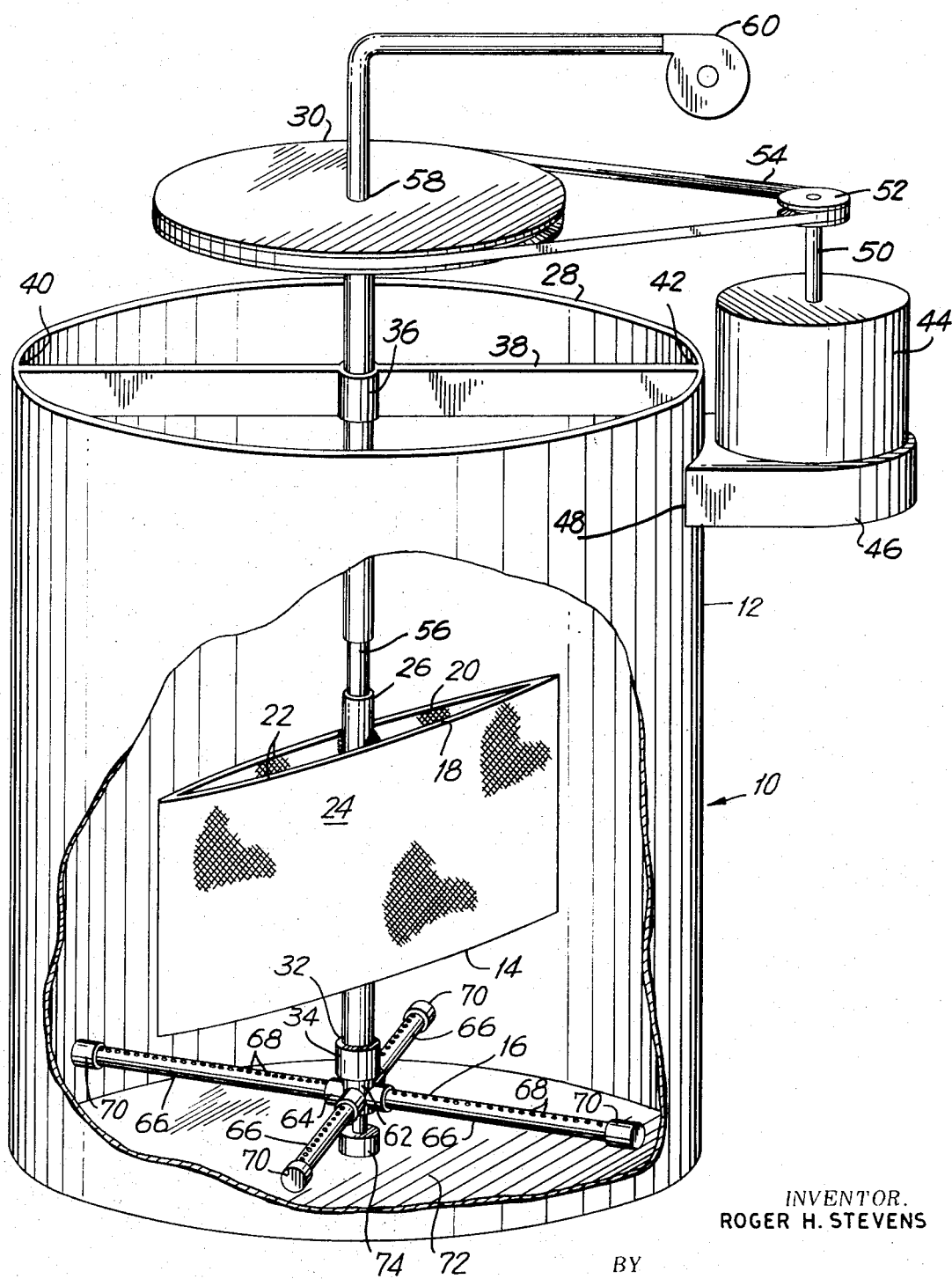
INVENTOR.
ROGER H. STEVENS
BY
Curtis, Morris & Safford
ATTORNEYS

METHOD FOR CONVERTING ANIMAL WASTE PRODUCTS INTO A FOOD SUPPLEMENT

This application is a continuation-in-part of copending patent application Ser. No. 879,194, filed Nov. 24, 1969 now U.S. Pat No. 3,633,547 and includes subject matter disclosed therein and divided out of said copending application which is the sole invention of applicant herein.

The present invention relates to a method and apparatus for converting animal waste products into a nutritious high protein feed supplement. More specifically, the invention pertains to a method and apparatus for converting animal waste products into a high protein content yeast product which may then be added to animals' grain meal feed mixture as a nutritious feed supplement.

The present invention provides a beneficial solution to two critical problems in the raising of animals such as swine for human consumption. The first problem is that created by disposal of the animal waste to preclude and effectively minimize the chance of pollution of the water supply by the animals' sewage. The dimensions of animal pollution at present have been lost to most ecologists in view of the present furor over industrial pollution. However, in a study undertaken by the American Society of Agricultural Engineers, the conclusion was reached that the sewage production of animals in the United States may be equivalent to the sewage which would be produced by one billion humans. There are, for example, approximately one hundred million swine in the United States with each producing sewage daily equivalent to two and one-half to three humans. There are also approximately fifty million cattle with each producing sewage equivalent to ten to fourteen humans daily. Such waste creates no problem if they are spread evenly over the land. However, the present trend in animal production is tending more and more toward confined systems wherein animals are grown and fattened within a confined environment until ready for slaughter. In these confined feeding arrangements, the animals are enclosed in a minimum space usually on concrete floors. Feed must be hauled in and waste products must be disposed of by hauling it away or by disposition in a sewage disposal system. It is the disposal of these waste products which creates one of the most serious restraints on mass production of animals in a confined environment.

There are many techniques presently in use to dispose of animal waste products, most of which create some form of water pollution. Wastes are allowed to run from feed lots situated on hillsides or simply washed away by rain. Some farmers build large artificial ponds or pools or use natural ponds and dispose of the animal waste products by putting the waste products into these ponds. This practice creates large odorous pools which attract flies and mosquitos. Some farmers have even built feed lots near open mine shafts so that the residues could be pumped directly into the earth. These methods of waste disposal create a pollution which eventually seeps into the water supply. In other cases, many farmers still continue to haul the collected waste back to the land as was done before confined feeding systems. However, if even one-third of the confined animal producers discarded the sewage rather than hauling it back to the land, the raw sewage introduced into the water supply would still be enormous.

At present, about 30 to 40 per cent of the swine produced in this country are raised in confined systems and the conversion to confined systems for swine production is accelerating. Ten years ago there were few if any confined swine producing operations but the number of confined swine producing operations is continuously growing. With the continued rate of growth confined swine producing systems, in a very few short years the accumulative effect of the waste disposal from one hundred million or more swine produced annually will create a pollution problem of significant magnitude.

This problem is even more accentuated when it is considered that up until recent years most of the agricultural wastes were cycled back to the land in the form of fertilizer to help enrich the yield of the land. But the growing economic urge to produce livestock near the big markets is changing this traditional cycle. Now, most poultry and a growing proportion of swine spend all or much of their lives in the confines of a feed lot or poultry house, often on the outskirts of a large city. Because of the transportation and labor costs involved in the collecting, drying and processing of manure into a useful fertilizer form, farmers now prefer the cheap concentrated and easy to apply artificial fertilizers. The result is that the outskirts of a number of large cities are marked by growing piles of manure with attendent flies, drainage problems and an ever increasing air and water pollution hazard. Because the present invention provides a convenient and economical method to dispose of all the waste products of animals produced in a confined system, this problem of the polluting effect of animal waste products is eliminated.

A second beneficial adjunct to the method and apparatus of the present invention is an increased economic yield in the growing of swine in a confined environment. Recycling of all of the animal's waste products, besides eliminating undesirable air and water pollution effects, also increases the economic efficiency of swine production. Feed costs for swine represent about 70 to 75 percent of the expense of raising swine. Swine rations are predominantly composed of corn for energy and soybean meal for protein supplement. Soybean meal represents about 11 to 22 percent of the swine feed ration by weight, depending upon the age and weight of the animal, and represents 20 to 36 percent of the total feed cost. Thus, with the process of the present invention, the recycled waste products after conversion to a protein rich product, are added to the normal swine feed ration in place of the soybean meal. Thus, food costs are lowered in that a portion of the normal food supply is supplanted by converted animal waste products and, also, costly sewage and waste disposal systems are eliminated.

The process and apparatus also lends itself readily to automation so that a typical confined animal shelter as disclosed in copending application Ser. No. 879,194, filed Nov. 24, 1969 can be managed and maintained by a single individual. Thus, one individual can readily care for up to five thousand swine housed in a structure as disclosed in the above-noted copending application utilizing the method and apparatus of the present invention for converting the animal waste products into a highly nutritious high protein feed supplement.

Accordingly, it is an object of the present invention to provide a method and apparatus for converting animal waste products into a nutritious high protein feed supplement.

It is a further object of the present invention to provide a method and apparatus for converting animal waste products into a product comprising high protein yeast which may be added to animals' feed formulation as a food supplement.

It is a still further object of the present invention to provide a method and apparatus to convert animal waste products by an aerobic process into a yeast product.

A further object of the present invention is to provide an apparatus to agitate and aerate a quantity of materials such as animal waste products in order to stimulate the conversion of the animal waste products into a high protein yeast product which may be added to animals' feed formulation as a food supplement.

A still further object of the present invention is to provide a method and apparatus for economically disposing of animal waste products produced by animals grown in a confined environment to preclude air and water pollution inherent in the disposal of such wastes.

These and other objects of the present invention will be more readily apparent after consideration of the following specification and drawing.

In the Drawing:

The single FIGURE of the drawing is a perspective view, with parts broken away, showing a preferred embodiment of the apparatus of the present invention.

In accordance with the preferred embodiment of the present invention, solid and liquid waste material from animals, such as swine, which may be housed in a confined environment, is collected in a processing vessel or drum. The drum is equipped with means to aerate and agitate the contents. A quantity of water is added to the drum to form a slurry of water and animal waste products and, initially, a culture of pure yeast, for example Candida utilis, is added to initiate the fermentation process. In addition, a small quantity of sugar may optionally be added to the slurry in order to generate sufficient starting materials or innoculants for the fermentation process. Air is then pumped through the drum by means of the aerator and the slurry is agitated to begin a fermentation process which converts the nitrogen in the animal waste product to a high protein product comprising amino acids by the propagation of the yeast Candida utilis. The conversion is very efficient and the high protein content product which is then tapped from the drum can be directly mixed with the animal's grain meal feed as a food supplement. Part of the product may be left in the drum to initiate the fermentation process of the next batch of animal waste products and water added to the drum.

With reference now to the drawing, the animal waste processing apparatus 10 includes a vat or storage drum 12 into which the solid and liquid waste products from animals, such as swine, are pumped. Disposed within the vat 12 are an agitating means 14 and an aerating means 16 to agitate and aerate a slurry of water and animal waste products. The agitating system includes a pair of aerating paddles 18 and 20 each comprising a peripheral frame assembly 22 within which is fixed an agitating panel 24 of an open grill work construction and which is preferably cut from a material such as expanded metal. Each of the paddles 18 and 20 are rigidly secured along a horizontal mid-portion thereof to a central shaft 26 extending generally axially of the drum 12.

Shaft 26 is a cylindrical shaft member which extends above the open top 28 of vat 12 and has secured thereto at its end a sheave member 30. The lower end 32 of shaft 26 is supported by a rotary bearing member 34 secured to the upper portion of the aerating assembly 16 so that shaft 26 can rotate when sheave 30 is rotated thus rotating the agitating paddles 18 and 20. The shaft 26 is journaled at the open top 28 of vat 12 within a journal bearing member 36 fixed to a cross-brace member 38 secured at its ends 40 and 42 to the inside surface of the vat 12 near the open top 28.

A motor 44 is provided which may be mounted by a bracket member 46 and rigidly secured as at 48 to the exterior surface of the vat 12. The output shaft 50 of motor 44 has a sheave 52 secured thereto and sheave 52 is coupled to sheave 30 by drive belt 54. Thus, motor 44 provides the rotative power to rotate shaft 26 and the agitating paddles 18 and 20.

Concentrically disposed within cylindrical shaft 26 is an air supply line 56 which extends through the center of sheave 30 through an access opening 58 therein. The upper end of air supply line 56 is operably connected to a suitable air compressor 60 and its lower end 62 is connected in fluid communication with an aerating assembly 16. Air supply line 56 is spaced from the interior wall of shaft 26 and does not rotate when shaft 26 is rotated.

Aerating assembly 16 includes a central manifold member 64 connected to the lower end 62 of air supply line 56. Radiating from the manifold member 64 are a plurality of tubular members 66 with each tubular member 66 being provided with air outlet openings 68 along their upper side thereof and end cap members 70. Thus, compressed air from compressor 60 flows through air supply line 56 to the manifold 64 and then out the tubular members 66 through the air openings 68 into the lower portion of the vat 12. The aerating assembly 16 is suitably supported on the bottom plate 72 of vat 12 by a pedestal support 74.

In operation, a slurry of water and animal waste products are added to the vat 12 to a level at least above the upper surface of the paddles 18 and 20 and motor 44 is actuated to rotate paddles 18 and 20 to agitate the slurry mixture. Air compressor 60 is started to force compressed air through air delivery line 56 and out air outlets 68 to disperse air within the slurry in vat 12. Because the paddles 18 and 20 have panel surfaces of an open grill work 24, the panels flow through the slurry mixture while agitating it and break up the stream of air flowing upwardly from air outlet openings 68 in the aerating assembly 16 below the paddles to effectively distribute the air into the slurry mixture for a purpose as will be more fully explained hereinbelow. Additionally, the air stream is broken up into air bubbles which are more readily dispersed and mixed into the slurry mixture to advantageously assist in the chemical conversion of the animal waste products into the nutritious high protein food supplement, as will be more fully explained hereinbelow.

According to an embodiment of the process of the present invention, a slurry of animal waste was added to the fermentation vat 12 in the ratio of about 10 pounds of liquid to 1 pound of solid waste material. The liquid included about 4 pounds of the liquid waste product of the swine and about 6 pounds of added water. The capacity of the vat was approximately 55 gallons to which 35 gallons of slurry was added. To initially start the fermentation process at the beginning of a cycle, one-half pint of cultured pure Candida utilis yeast and one-half pint of Bakers yeast, in aqueous solution of about 25 percent dry yeast, and 5 pounds of sugar were added to the vat. Compressor 60 was started and the compressor was operated at about its capacity which was to supply air at standard pressures and temperatures at the rate of 100 liters per minute. The agitating system 14 was operated at 50 rpm in order to effectively break up solid particles in the slurry and to maintain the particles in nearly perfect solution form. In larger units the speed would be less to obtain a comparable tip speed of the agitator. Additionally, as noted above, the high speed rotation of the agitating system breaks up the air stream emitted from the air access openings 68 into smaller more diffuse bubbles of air which are readily dispersed within the solution. The solution was then maintained at a temperature of about 90°F. plus or minus five degrees, for example by a heating unit controlled by a temperature responsive heating element (not shown), and the pH of the solution was periodically checked. Suitable temperatures may be from about 75°F. up to almost 100°F., about 75°F. to 95°F. For the most conducive conversion of the animal waste products into yeast according to the process of the present invention, it has been found that a pH between 4.5 and 5 is most effective to provide the best possible environment for growth of the yeast culture while retarding the growth of aerobic bacteria. The pH range may however be from about 4 up to almost 7, about 4 to 6.5. Accordingly, dependent upon the pH reading, phosphoric acid is periodically added when necessary in order to maintain the pH of the solution in the preferred range between 4.5 and 5.

While the apparatus of the present invention supplies compressed atmospheric air to the fermentation vat, it is to be understood that it is the oxygen in the air which reacts to assist in the conversion of the animal waste products into a yeast product. The more oxygen that can be supplied rapidly to the mixture in the vat 12 the more rapid the conversion. Thus, it is important to supply oxygen to the mixture and retain the oxygen in solution to permit the conversion of the waste products into a yeast product. The rotating paddles 18 and 20 break up the air stream, as noted above, into fine bubblets of air which are more readily dispersed throughout the mixture and which create a greater surface area of contact between the oxygen in the air bubbles and the waste products in solution.

The process of this invention results in the generation of a considerable amount of heat and carbon dioxide which may be vented to the atmosphere or collected. Therefore, depending on ambient conditions, the heating unit referred to above may include means to cool the vat to maintain the desired temperature.

In this environment, it has been found that fermentation through a metabolic process occurs whereby animal waste products are aerobically converted to a yeast product of Candida utilis to a highly significant degree.

It is to be understood that the high protein feed supplement can be produced by a batch process, i.e., no input or takeout until complete fermentation, or on a continuous run basis wherein part of the product is removed and raw animal waste added at periodical intervals. In an embodiment of the invention according to the procedure outlined above, after an initial fermentation period of three days, about 2½ gallons of the fermented slurry product were removed for each of two daily feedings of swine and about 2½ gallons of a slurry of swine waste products were added immediately thereafter. The slurry of waste products was substantially that described above and averaged about 13 percent solids by weight. It was found that the 2½ gallons of newly added animal waste products were fully assimilated in the 55 gallon mixing vat and sufficiently fermented so that within twelve hours, the interval between feedings, about 2½ gallons of feed supplement which averaged about 12 percent solids by weight, were removed from the vat. The product removed from the vat was completely and directly used as a feed supplement as described below.

In a procedure utilizing five test pigs and five control pigs, the five test pigs were fed a diet of corn and bean meal supplemented with the high protein yeast-containing product resulting from processing the animal waste products in the manner discussed above, without additional drinking water. The five control pigs were fed a diet of the same corn and bean meal combination without the high protein feed supplement but with drinking water available for the pigs. The control group pigs were fed a feed ration of 85 percent corn, 10 percent bean meal and 5 percent minerals with water available for the pigs to drink at will; the dry feed totaled about twenty pounds per day for the control group. Since the pigs were fed in a group, the amount eaten by each varied according to their habits. The test group pigs were fed the same amount of feed ration supplemented by about five gallons per day for the test group of the high protein supplement which was a solution of about 12 percent by weight dry product and the remainder liquid. The animal waste products for this procedure were obtained from several pigs which each produced about one pound of solid waste and about four times this amount of liquid waste to which water was added. This waste was used to produce almost an equal amount of feed supplement by the above described process. The pigs in each group gained the weight shown in Table I when fed according to the above schedule for two months.

TABLE I

| CONTROL GROUP PIGS | INITIAL WEIGHT | WEIGHT GAIN LBS. |
|---|---|---|
| A | 72 | 40 |
| B | 74 | 28 |
| C | 76 | 62 |
| D | 80 | 37 |
| E | 84 | 62 |
| | Total Weight Gain | 229 |
| TEST GROUP PIGS | INITIAL WEIGHT | WEIGHT GAIN LBS. |
| F | 68 | 60 |
| G | 74 | 62 |
| H | 76 | 63 |
| I | 80 | 69 |
| J | 86 | 67 |
| | Total Weight Gain | 321 |

From a statistical analysis between the test results it can be shown that with a 95 per cent certainty there is a significant difference between the two test groups which indicates that the test group pigs fed the standard diet supplemented by the high protein supplement from the converted animal waste product showed superior weight gain results. Hence, this process of converting animal wastes into a feed supplement produces a product of significant nutritional value.

As a general indication of the production of amino acids in the fermentation process in propagating the growth of the yeast product from the organic waste products of swine manure, reference is made to Table II below which shows a comparison of the amino acid content in a raw solid swine manure, and a sample of the product of the semi-continuous process described above and although the amino acid content may vary, the following figures give an indication of the nutrition value of the product made by the process of the present invention. The amino acid content reflects the nutritional value of the product and is useful in supplying the necessary proteins for animal growth. Upon analysis, the fermented product did not contain any detectable amount of urea.

TABLE II

Amino Acid Content as a Percentage of Dry Matter Weight

| AMINO ACID | % IN RAW SWINE MANURE | % IN FERMENTED PRODUCT |
|---|---|---|
| LYSENE | .15 | 1.03 |
| HISTIDINE | .03 | .36 |
| ARGININE | .08 | .91 |
| ASPARTIC ACID | .20 | 1.51 |
| PROLINE | .11 | .82 |
| GLYCINE | .13 | .98 |
| ALAMINE | .18 | 1.16 |
| VALINE | .12 | .88 |
| METHIONINE | NOT DETERMINED | .34 |
| ISOLEUCINE | .10 | .75 |
| LEUCINE | .18 | 1.44 |
| TRYOSINE | .09 | .63 |
| PHENYLALINE | .14 | .83 |
| TRYPTOPHANE | NOT DETERMINED | .10 |

Thus, it is seen that in addition to providing a method and apparatus for disposing of animal waste products in a clean and efficient manner so as to obviate any polluting effects of animal waste disposal, the present invention also provides a method and apparatus for converting animal waste products into a nutritious high protein feed supplement which shows a marked ability to provide nutritional value for swine.

The above procedure is preferably carried out with the yeast Candida utilis, either alone or with additional yeasts to initiate the fermentation of swine waste. Other yeasts may be used with or in place of the Candida utilis. The amount of yeast used to initiate the process may be varied and such amount is of significance mainly in determining the time necessary to achieve steady-state conditions.

The yeasts having the greatest potential utility are those normally classified as the sugar fermenting yeasts which additionally have the property of assimilating nitrogen from urea. Examples of these yeasts are those classified as Saccharomyces or Torula, as listed in U.S. Pat. No. 3,105,799. Once the fermentation is initiated, the process can be carried out by the batch method, continuously or semi-continuously by the addition of swine waste, with water as desired, and the removal of a feed supplement which can be fed directly to animals. Although the solid product produced by this process may be separated from the slurry and fed to animals, an advantage of this process is that the slurry output can be used directly as an animal feed. The amount of water used can be varied widely to produce an easily handled slurry of animal waste products for input to the process. The input slurry preferably contains from one to twenty five per cent solid waste. The animal waste products themselves can be used as the input slurry when sufficient animal liquid waste is available. Other ingredients can be added during the fermentation process to supplement the output of useful products, such as minerals normally fed to animals and those conventionally used in fermentation processes, an inorganic nitrogen source, i.e., ammonia, and additional sources of organic materials, i.e., corn. The amount of air used can also be varied widely; for the conditions shown the rate is preferably from about 50 to 120 liters per minute. The theoretical requirements for fermentation are lower, but an excess is used because the oxygen is not completely absorbed in the slurry. Stated in terms of the product produced, the air was supplied at a rated capacity of 28,800 liters of air per pound of product.

The converted swine waste may comprise, as shown above, about twenty per cent of the total dry feed for an animal, although greater or lesser amounts may be used. The product of this invention is particularly useful as a substitute for, or supplement to, conventional high protein animal feeds, such as bean meal. Although this invention has been illustrated by the conversion of swine wastes, other animal wastes may be used and the products produced may be fed to swine or other domestic animals, for example nonruminating animals.

What is claimed is:

1. A method of increasing the weight of a group of swine which comprises:

forming a slurry of solid and liquid waste products of said swine and a yeast capable of assimilating nitrogen from urea, said slurry containing from 1 to 25 percent of said solid waste;

aerating and agitating said slurry while maintaining its temperature at about 75° to 95°F and its pH at about 4 to 6.5 for a period of time sufficient to effectuate a fermentation process and which produces a swine feed supplement by converting the nitrogen in said waste to a high protein product containing increased amino acids in an amount over that in the raw product and feeding said swine feed supplement to said swine.

2. The process of claim 1 wherein phosphoric acid is added to said slurry to maintain said pH.

3. The method of claim 1 wherein a portion of said product of the fermentation is periodically withdrawn from said vessel and a similar amount of said waste product is added to said vessel.

4. The method of claim 1 wherein said slurry contains approximately 13 percent solids by weight.

5. The method of claim 1 wherein said swine feed supplement contains approximately the same solids content as said slurry.

6. The method of claim 1 wherein said fermentation process is initiated by the addition of yeast and a sugar to said waste products.

7. The method of claim 6 wherein said yeasta is Candida utilis.

8. A method of increasing the weight of a group of swine and disposing of their waste products which comprises:

forming an aqueous slurry of the solid and liquid excrement from said swine, said slurry containing a yeast product;

and said slurry containing from about 1 to 25 percent of said solid excrement;

aerating said slurry while maintaining its temperature at about 75° to 95°F and its pH at about 4 to 6.5 until the percentage of protein in the excrement slurry has increased and the urea content thereof has been substantially eliminated to thereby form a swine feed supplement;

mixing said swine feed supplement with conventional swine rations and, feeding said mixture to said swine.

9. The method of claim 8 wherein the conventional swine rations comprise corn and soy bean.

10. The method of claim 8 wherein phosphoric acid is added to the slurry to maintain it at said pH.

11. The method of claim 8 wherein said process is carried out in a vessel, a portion of said treated slurry is periodically withdrawn from said vessel and a similar amount of said waste product is added to said vessel.

12. The method of claim 8 wherein the step of aerating said slurry comprises dispersing pressurized oxygen-bearing gas in said slurry and breaking up said gas into bubblets thereby to maintain said gas bubblets in solution in the slurry.

13. The method of claim 8 wherein the conversion of the swine waste is initiated by the addition of yeast and a sugar to said aqueous slurry.

14. The method of claim 13 wherein said yeast is Candida utilis.

15. A method comprising the steps of forming an aqueous slurry of solid and liquid swine excreta, said slurry containing from about 1 to 25 percent of said solid excreta, said slurry containing a yeast product, aerating said slurry while maintaining it at a temperature of about 75° to 95°F and at a pH of about 4 to 6.5 until the urea content of said swine excreta slurry has been substantially eliminated thereby forming a swine feed supplement, and feeding the swine feed supplement obtained thereby to swine.

16. A continuous method for converting swine waste products into a swine feed supplement comprising the steps of (1) aerating an aqueous slurry of solid and liquid swine excreta in a vessel, said slurry containing from about 1 to 25 percent of said solid excreta and, said slurry containing a yeast product, while maintaining it at a temperature of about 75° to 95°F and its pH at about 4 to 6.5 until the urea content of said swine excreta has been substantially eliminated and (2) periodically removing a portion of said slurry from said vessel for use as a swine feed supplement and replacing each said portion with a similar amount of solid and liquid swine excreta in said vessel for treatment as described in step (1).

* * * * *